United States Patent [19]
Zellers et al.

[11] Patent Number: 6,145,842
[45] Date of Patent: Nov. 14, 2000

[54] STEPPED SEAL AND BUSHING

[75] Inventors: Steven Wayne Zellers, Indianapolis; Steven Franklin James, Zionsville, both of Ind.

[73] Assignee: General Motors Corporation, Detroit, Mich.

[21] Appl. No.: 09/149,126

[22] Filed: Sep. 8, 1998

[51] Int. Cl.[7] ................................................. F16D 33/00
[52] U.S. Cl. .................. 277/394; 60/330; 60/336; 277/928
[58] Field of Search .................... 277/309, 928, 277/926, 549, 571, 585; 192/112; 384/132, 131; 60/330, 366

[56] References Cited

U.S. PATENT DOCUMENTS

| | | | |
|---|---|---|---|
| 3,952,508 | 4/1976 | Bopp | 60/330 |
| 5,009,435 | 4/1991 | Villanyi et al. | 277/552 |
| 5,720,167 | 2/1998 | Marich | 60/339 |
| 5,852,931 | 12/1998 | Reichenmeller et al. | 60/330 X |

FOREIGN PATENT DOCUMENTS

| | | | |
|---|---|---|---|
| 1201692 | 9/1965 | Germany | 60/330 |
| 4435593 | 4/1996 | Germany | 60/330 |

OTHER PUBLICATIONS

PCT Pub. No. WO96/11346, Reichenmiller et al., Automatic Gearbox with a Positive–Displacement Pump, Apr. 1996.

*Primary Examiner*—Anthony Knight
*Assistant Examiner*—Enoch Peavey
*Attorney, Agent, or Firm*—Laura C. Wideman

[57] ABSTRACT

A torque converter has a lip seal abutting the torque converter impeller control pump drive hub. The drive hub is rotatably supported in a transmission housing. Oil from the drive hub side of the bushing passes through the bushing into a chamber sealed from atmosphere by the lip seal. The lip seal has a component rotatably sealing on a diameter greater than the drive hub diameter. The bushing, in one embodiment, has a control passage for exhausting a portion of the oil from the control pump side prior to reaching the chamber.

5 Claims, 3 Drawing Sheets

STEPPED SEAL AND BUSHING

TECHNICAL FIELD

This invention relates to seal and bushing structures, and more particularly, to such structures in rotating machines having a high fluid pressure source.

BACKGROUND OF THE INVENTION

Power transmissions include a torque converter which is effective to transmit power from an engine to a multi-speed power transmission. The torque converter permits the transmission to operate at a neutral condition without disengaging the clutches and/or brakes in the transmission. The torque converter will also provide power to a power take-off gear (PTO). When significant PTO power or high engine power without vehicle travel is required, the transmission gearing is placed in neutral so that the engine can operate at elevated power levels.

In vehicles such as cement mixers, the throttle setting and therefore the engine speed and power requirement can be quite high during load mixing. Engine speeds in the range of 2000 to 3000 rpm are not uncommon during these operations. Since the hydraulic control pump is driven directly by the torque converter impeller, the pump speed, output volume and torque converter pressure are quite high. Under this condition, a significant amount of oil is circulated to the torque converter and the lubrication and cooling circuits causing an increase in the volume of oil sent to the lubrication and cooling circuit; and also to the bushing supporting the hub connecting the impeller with the control pump.

Under this condition, it has been found that an inordinate amount of oil can bypass a lip seal which sealingly abuts the control pump drive hub on the torque converter impeller. The area beyond the seal is open to atmosphere therefore, any leakage which occurs will be visible. It has been noted that this condition appears after many hours of operation and not in transmissions newly put into use.

In a related U.S. patent application Ser. No. 09/149,352, filed Sep. 8, 1998, another solution to this problem is put forth, wherein an integral splash lip is disposed integral with the seal assembly between the bushing and the lip seal.

SUMMARY OF THE INVENTION

Testing of prior art transmissions, after leakage is observed has resulted in the following conclusions. Transmission input speed, converter inlet pressure, and sump temperature have much influence on the leaks. It has also been noted that increasing the diametral clearance of a bushing axially adjacent the lip seal increases the leakage. Placing additional exhaust passages in the chamber between the bushing and seal does not alleviate the problem.

Therefore, it is an object of the present invention to provide an improved bushing and seal structure at the input member of a torque converter.

In one aspect of the present invention, the shaft, on which the seal and bushing are effective, has an increased diameter which presents a radial shoulder between the bushing and the seal.

In another aspect of the present invention, the seal lip sealingly abuts the increased diameter of the shaft.

In yet another aspect of the present invention, a sleeve is pressed onto the shaft to create the increased diameter and radial shoulder.

In still another aspect of the present invention, the sleeve has a first diameter portion axially aligned with the bushing and a second and larger diameter portion aligned with the seal.

In a further aspect of the present invention, the bushing has an exhaust passage formed therein between the axial ends of the bushing to reduce the amount of oil flow through the bushing and into a chamber between the bushing and the seal.

After much testing, it was determined that the converter in pressure, pressure at the transmission control pump side of the bushing, had little effect on the amount of leakage. The pressure in the chamber between the bushing and the seal likewise did not significantly influence the leakage. The inventors then considered that the velocity of the oil leaving the bushing and impinging on the seal lip was a primary factor of this phenomenon. The aforementioned object and aspects have provided a solution to the problem. The structures proposed reduce the axial velocity of the oil leaving the bushing prior to reaching the lip of the oil seal.

DESCRIPTION OF EXEMPLARY EMBODIMENTS

Figure 1:
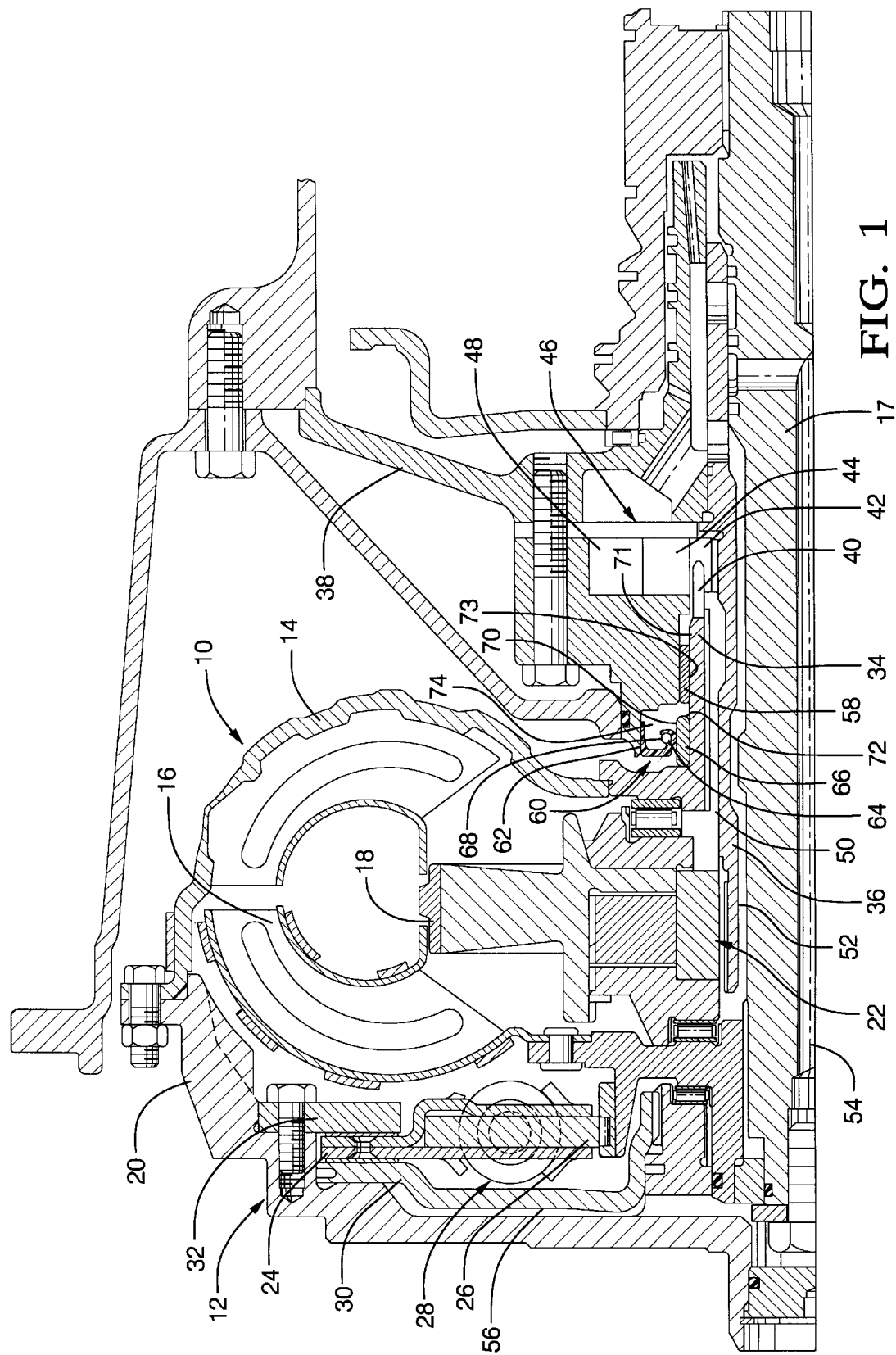
FIG. 1 is a cross-sectional elevational view of a torque converter assembly incorporating a bushing and seal structure corresponding to one embodiment of the present invention.

Referring to the drawings, where like characters represent the same or corresponding parts throughout the several views, there is seen in FIG. 1, a torque converter assembly 10 including a torque converter clutch assembly 12, an impeller 14, a turbine 16 and a stator 18. The torque converter assembly 10 is a convention drive mechanism well-known to those skilled in the art. The impeller 14 receives input power from an engine, not shown, through an input shell 20. Hydraulic fluid or oil is circulated by the impeller 14 to transfer power to the turbine 16 which is drivingly connected with a transmission input shaft 17.

The stator 18 redirects the hydraulic fluid for reentry to the impeller 14. This results in a speed ratio between the impeller 14 and the turbine 16 as well as a torque multiplication. Maximum torque multiplication occurs when the turbine is stationary and the impeller rotates at high speed. This is the "stall" operation of the torque converter 10 during which the stator is prevented from reverse rotation by a conventional one-way torque transmitter 22. When the speed ratio (impeller/turbine) reaches a predetermined design point, the fluid exiting the turbine 14 impinges on the back side of the blades of the stator 18 causing forward rotation and a reduction in torque multiplication. The one-way torque transmitter 22 permits the forward rotation of the stator. This operation is well-known.

The torque converter clutch 12 has an input member 24, an output member 26 and a conventional vibration damper 28 connected therebetween. The input member 24 is frictionally engaged between a piston 30 an a pressure plate 32 to ensure conjoint rotation with the input shell 20. The output member 26 is drivingly connected with the transmission input shaft 17. The damper 28 reduces the engine torsional vibration imposed on the input shell 20 in a well-known manner when the clutch 12 is engaged. Those familiar with the transmission art will be aware that the torque converter clutch 12 is engaged when the torque converter assembly 10 approaches the "coupling stage"; which stage occurs when the impeller speed and the turbine speed are almost equal. The engagement of clutch 12 improves the overall efficiency of the transmission.

The impeller 14 has a pump drive hub 34 which extends axially in coaxial relation with a stator shaft 36 and the transmission input shaft 17. A stator shaft 36 is secured to a transmission housing 38 to provide a ground for the one-way torque transmitter 22. The pump drive hub 34 has drive tangs 40 which engage drive tangs 42 formed on a gear member 44 of a conventional positive displacement gear pump 46. The gear member 44 meshes with another gear member 48 in a well-known manner. The assembly and operation of such pumps is known to those skilled in the art such that a more complete description is not considered necessary at this point.

The pump 46 supplies hydraulic oil at elevated pressures for use by the transmission torque transmitters, not shown, the torque converter assembly 10, the torque converter clutch 12, as well as the transmission control valuing, lubrication and cooling in a well known manner. The torque converter assembly 10 receives fluid from a passage 50 formed between the hub 34 and the stator shaft 36. Hydraulic oil is returned form the torque converter assembly 10 through a passage 52 formed between the transmission shaft 17 and the stator shaft 36. The torque converter clutch 12, when engaged, is pressurized by hydraulic oil in a passage 54 formed in the shaft 17 and delivered to a chamber 56 between the piston 30 and the input shell 20. The torque converter clutch 12 is held disengaged by oil in the torque converter assembly 10 when the passage 54 is not pressurized.

The hub 34 is rotatably supported in a bushing 58 secured in the housing 38. Since the bushing 58 requires lubrication, a space between the hub 34 and the housing 38 is open to the oil in passage 50 which feeds the torque converter assembly 10. A seal assembly 60 is provided to prevent the lubrication oil passing through the bushing 58 from leaking to atmosphere around the outside of the torque converter assembly 10.

The seal assembly 60 has a casing 62 secured in the housing 38, a lip 64 which engages a sleeve 66 pressed onto the hub 34 and a garter spring 68 which urges the lip 64 into abutment with an outer diameter 70 of the sleeve 66. The diameter 70 is greater than the diameter 71 of the hub 34 and the inner diameter 73 of the bushing 58. The sleeve 66 has an annular end portion or shoulder 72 facing the bushing 58 such that any oil passing through the bushing 58 will impinge on the end portion 72 prior to reaching the lip 64 of the seal assembly 60. The usefulness of this structure will become more apparent with the following description of intermittent operation of the torque converter assembly 10.

The torque converter assembly 10 during much of its operation is transmitting power from an engine to a multispeed transmission. However, there are operating procedures undertaken by the vehicle, in which the torque converter assembly 10 is installed, that do not include the gearing portion of the transmission. During these periods, the transmission gearing is placed in neutral and the engine is operated at an elevated idle speed. The elevated idle speed can be in the range of 2000 to 3000 rpm. Also, in the neutral condition, the feed pressure to the torque converter is elevated in the passage 50. During the elevated idle operation, the oil passes through the torque converter in the normal fashion but an inordinate amount of oil passes through the bushing into a chamber 74 between the seal assembly 60 and the bushing 58.

The oil passes through the bushing 58 and exits into the chamber 74 at a high velocity and with a considerable amount of velocity energy. The high velocity oil impinges the end portion 72 which reduces the velocity energy such that the pressure level of the fluid increases. However, the high velocity oil cannot impinge the lip 64 of the seal assembly 60. The seal assembly 60 can adequately seal against the increased oil pressure in the chamber 74 for the time period it takes to relieve the large volume of pressurized oil passing through the bushing 58. This oil is returned to the transmission sump in a conventional manner through a passage, not shown, formed in the housing 38.

Figure 4:
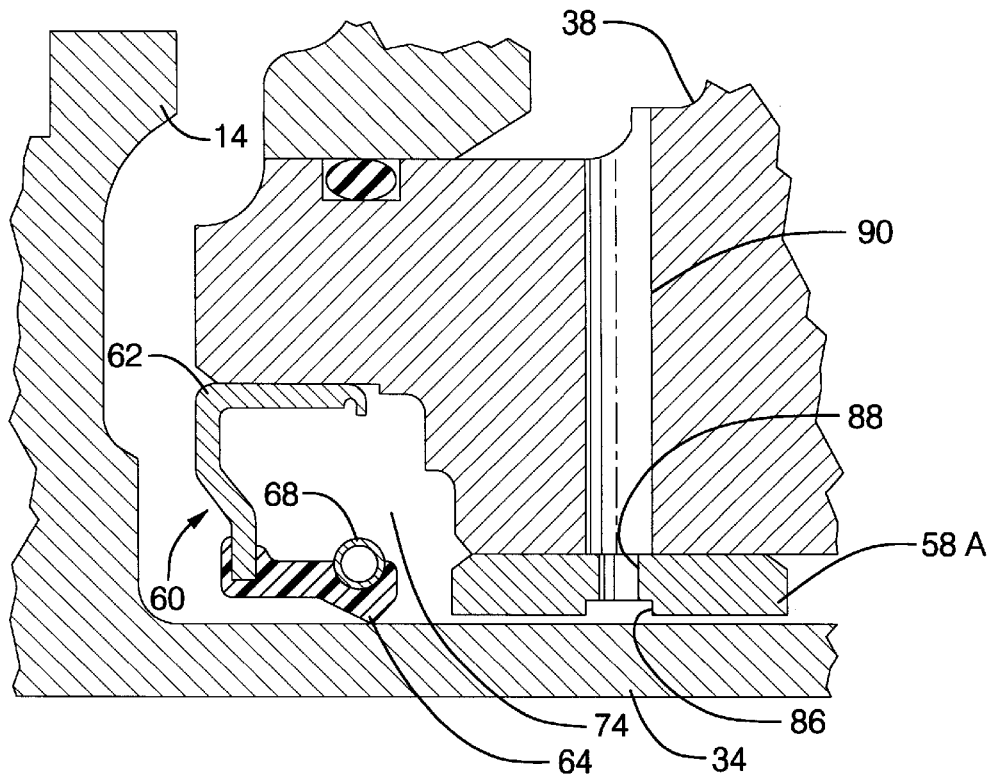
FIG. 4 is yet another elevational view similar to FIG. 2 incorporating a further embodiment of the present invention.
Figure 5:
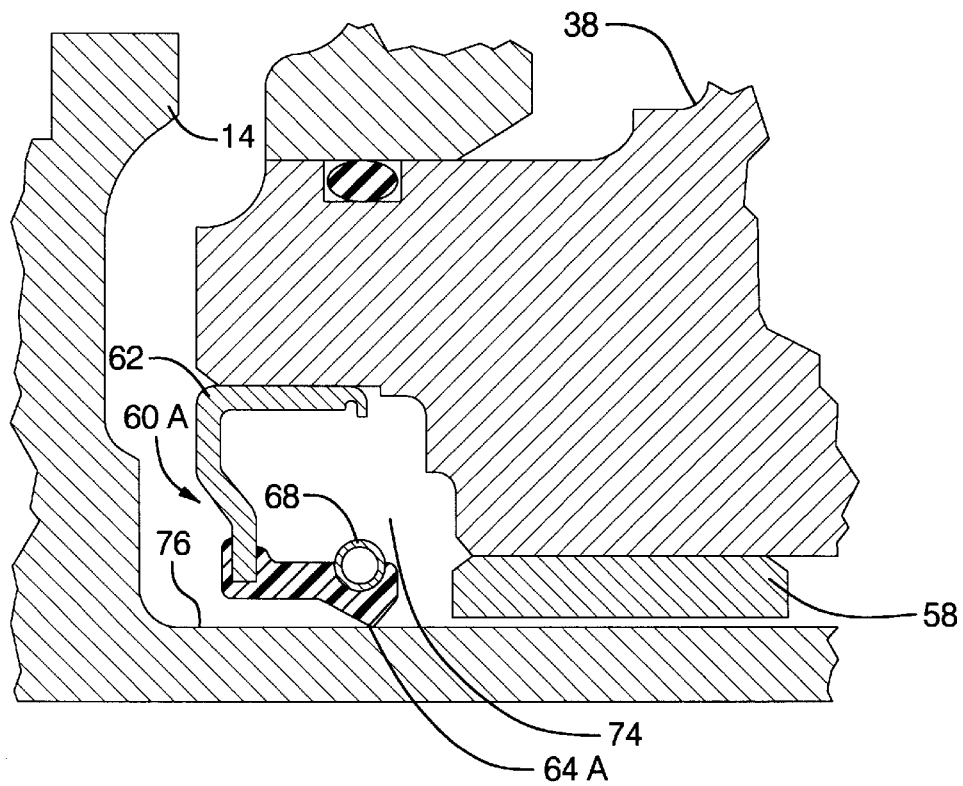
FIG. 5 is an elevational view similar to FIG. 2 depicting a prior art assembly.

It is believed that the prior art structures, such as that shown in FIG. 5, permit the oil to leak to atmosphere during this condition. The high velocity oil impinging on the lip 64A of seal assembly 60A causes the lip 64A to be lifted from the surface 76 on the hub 34A resulting in oil leakage under the lip 64A to atmosphere. The present invention, as described above with reference to FIG. 1 and as will be described with reference to FIGS. 2–4, prevents the lifting of the seal lip 64 and therefore confines the oil passing through the bushing 58 to the chamber prior to its return to the transmission sump.

Figure 2:
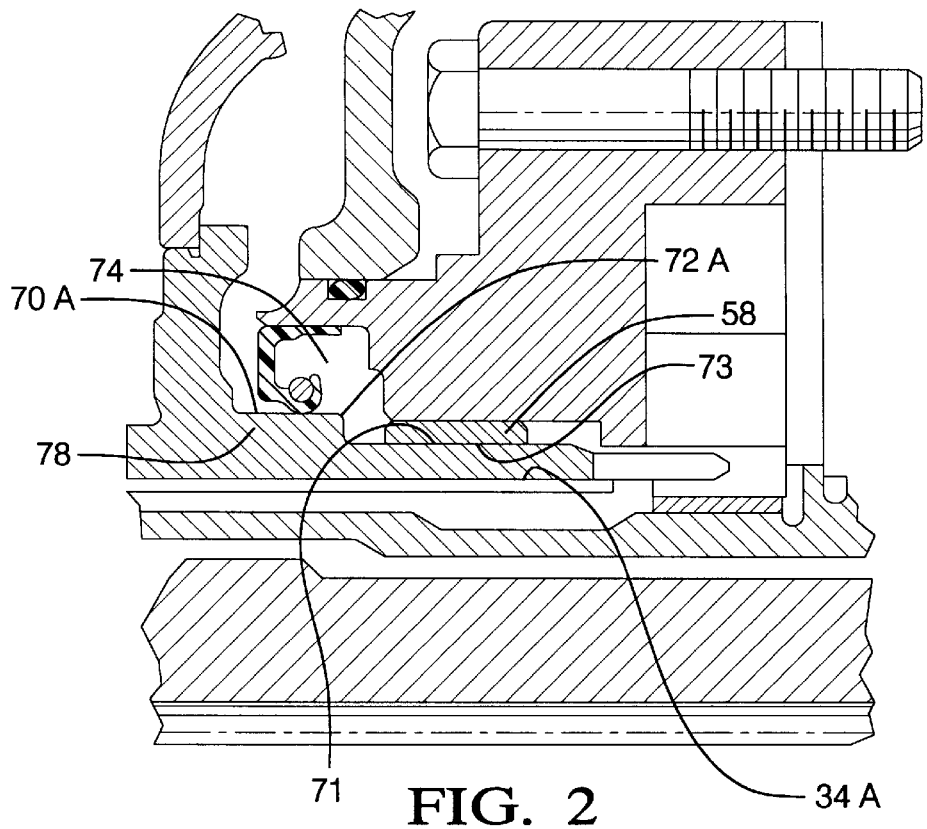
FIG. 2 is an elevational view of a portion of the assembly of FIG. 1 incorporating another embodiment of the present invention.

The structure shown in FIG. 2 is similar to that described above for FIG. 1. The major difference is that the hub 34A has an axial portion 78 with an outer diameter 70A which is larger than the inner diameter 73 of the bushing 58. The axial portion 78 presents a shoulder or end face 72A to any stream of high velocity oil leaving the bushing 58. Thus, the lip 64 is not subjected to the impingement of high velocity oil and the leakage is prevented.

Figure 3:
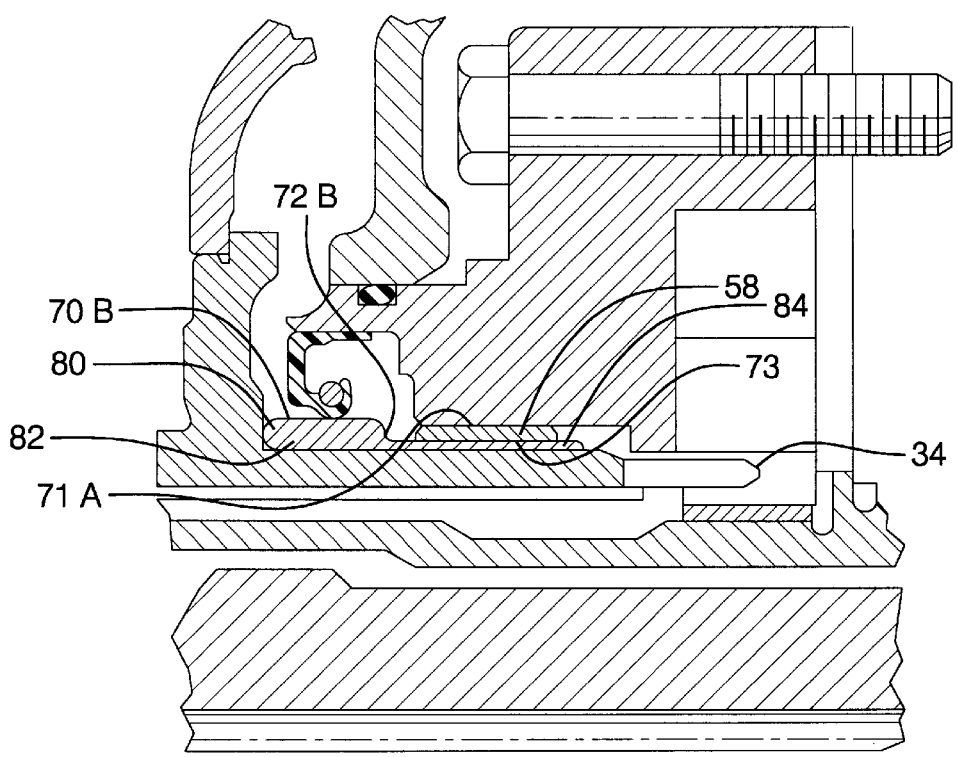
FIG. 3 is another elevational view similar to FIG. 2 incorporating yet another embodiment of the present invention.

The structure shown in FIG. 3 is similar to that described above for FIGS. 1 and 2. The major difference in the velocity inhibiting structure is that a sleeve 80 is pressed onto the hub 34 which has more length than the sleeve 66 shown in FIG. 1. The sleeve 80 has an axial portion 82 having an outer diameter 70B which is larger than an outer diameter 71A of an axial portion 84. The hub 34 is disposed in the bushing 58 such that the inner diameter 73 is axially and radially adjacent the diameter 71A. The diameter 70B has a shoulder 72B disposed to intercept any high velocity oil stream exiting the bushing 58. As with the structures of FIGS. 1 and 2, this prevents impingement of the oil stream on the lip 64 of the seal assembly 60.

The structure shown in FIG. 4 presents another embodiment of the invention to interrupt the high velocity oil stream prior to impingement on the lip 64 of the seal assembly 60. In this embodiment, bushing 58A has a central annular recess 86 connected with a plurality of exhaust openings 88. Each of the exhaust openings 88 is in communication with respective exhaust passages 90 formed in the housing 38. The increased oil volume enters the bushing 58A from the right, as viewed in FIG. 4. As the oil reaches the annular recess 86, it will be partially exhausted through the exhaust openings 88 and the exhaust passages 90. This will reduce the amount of oil flowing completely through the bushing 58A into the chamber 74. As will be appreciated, by those skilled in the art, the velocity of the oil leaving the bushing 58a will be reduced accordingly. Even though the lip 64 and bushing 58A have essentially the same diameter, the velocity of the oil stream is sufficiently reduced to thereby prevent lifting of the lip 64.

What is claimed is:

1. A seal and bushing apparatus in a rotating machine having a source of high pressure fluid adjacent said bushing and a low pressure chamber between said seal and said bushing comprising:

a bushing secured in a housing member;

a rotating shaft member supported in said bushing;

a source of high pressure oil at one side of said bushing;

a seal secured in the housing having a lip portion sealingly abutting said rotating member and cooperating with said bushing and the housing to provide a low oil pressure chamber;

a stream of pressurized oil flowing between said bushing and the rotating member; and means intermediate said seal and said seal bushing for reducing the velocity of the oil stream prior to the stream reaching said lip portion of said seal, said velocity reducing means comprising an axial portion on said rotating member abutting said lip portion, said axial portion having a greater diameter than a diameter of a portion of the rotating member supported in said bushing.

2. The seal and bushing apparatus defined in claim 1 wherein said axial portion includes a shoulder portion disposed between said lip portion and said bushing.

3. The seal and bushing apparatus defined in claim 1 wherein said axial portion includes a shoulder portion disposed between said lip portion and said bushing.

4. The seal and bushing apparatus defined in claim 1 wherein said bushing has an inner diameter circumjacent said shaft member and said velocity reducing means comprises a radially extending shoulder on said shaft disposed between said bushing and said seal wherein said shoulder has a diameter greater than said inner diameter of the bushing.

5. A torque converter assembly comprising:

a housing;

a bushing secured in the housing;

a rotating shaft member supported in the bushing;

a source of high pressure oil at one side of the bushing;

a seal secured in the housing having a lip portion sealingly abutting the rotating member and cooperating with the bushing and the housing to provide a low oil pressure chamber;

a stream of pressurized oil flowing between the bushing and the rotating member; and an exhaust passage formed in the bushing distributing a portion of the oil stream to a second low pressure chamber to reduce the amount of oil in the oil stream leaving the bushing wherein the exhaust passage reduces the velocity of the stream of pressurized oil prior to the stream reaching the lip portion of the seal.

\* \* \* \* \*